(12) United States Patent
Liu et al.

(10) Patent No.: US 8,496,304 B2
(45) Date of Patent: Jul. 30, 2013

(54) ELECTRONIC DEVICE ENCLOSURE

(75) Inventors: Chao Liu, Wuhan (CN); Zhi-Ping Wu, Wuhan (CN); Xu-Dong Nan, Wuhan (CN)

(73) Assignees: Hong Fu Jin Precision Industry (WuHan) Co., Ltd., Wuhan (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/426,734

(22) Filed: Mar. 22, 2012

(65) Prior Publication Data

US 2012/0326581 A1 Dec. 27, 2012

(30) Foreign Application Priority Data

Jun. 24, 2011 (CN) .......................... 2011 1 0173045

(51) Int. Cl.
 *A47B 97/00* (2006.01)
(52) U.S. Cl.
 USPC ....................................................... 312/223.2
(58) Field of Classification Search
 USPC ................................ 312/223.1, 223.2, 330.1; 361/679.33–679.39; 248/213.2, 221.11, 309.1, 248/316.7
 See application file for complete search history.

(56) References Cited

U.S. PATENT DOCUMENTS

| 5,768,099 | A  | * | 6/1998  | Radloff et al. ........... 361/679.31 |
| 6,416,031 | B1 | * | 7/2002  | Billman ........................ 248/694 |
| 6,445,663 | B1 | * | 9/2002  | Chen et al. ..................... 720/652 |
| 7,233,490 | B1 | * | 6/2007  | Lai ............................ 361/679.33 |
| 7,254,018 | B2 | * | 8/2007  | Zhang et al. .............. 361/679.33 |
| 7,495,909 | B1 | * | 2/2009  | Chen et al. ............... 361/679.37 |
| 7,639,488 | B2 | * | 12/2009 | Tu ............................ 361/679.33 |
| 7,697,276 | B2 | * | 4/2010  | Peng et al. ............... 361/679.33 |
| 7,701,702 | B2 | * | 4/2010  | Chen et al. ............... 361/679.33 |
| 7,826,209 | B2 | * | 11/2010 | Chen et al. ............... 361/679.37 |
| 7,848,097 | B2 | * | 12/2010 | Yang ........................ 361/679.33 |
| 8,320,114 | B2 | * | 11/2012 | Peng et al. ............... 361/679.31 |
| 8,430,367 | B2 | * | 4/2013  | Tu et al. .................... 248/220.21 |
| 2008/0057781 | A1 | * | 3/2008 | Chen et al. ..................... 439/577 |
| 2009/0189042 | A1 | * | 7/2009 | Chen et al. ................. 248/309.1 |
| 2011/0031362 | A1 | * | 2/2011 | Chang ..................... 248/220.21 |

\* cited by examiner

*Primary Examiner* — James O Hansen
*Assistant Examiner* — Matthew Ing
(74) *Attorney, Agent, or Firm* — Altis Law Group, Inc.

(57) ABSTRACT

An electronic device enclosure includes a frame, a limiting member located in the frame, a limiting member located in the frame, a mounting bracket, and a maintaining member. The frame includes a mounting plate. The mounting bracket is adapted to receive a data storage device and includes a first sidewall and a second sidewall opposite to the first sidewall. The second sidewall is secured to the mounting plate. A first end of the first sidewall is rotatably received in the limiting member. A second end of the first sidewall opposite to the first end is hung on the frame. A protruding block protrudes from the second end. The maintaining member includes a positioning portion and two latching poles secured to the mounting plate. The protruding block is engaged with the positioning portion and located between the positioning portion and the mounting plate.

19 Claims, 3 Drawing Sheets

ELECTRONIC DEVICE ENCLOSURE

BACKGROUND

1. Technical Field

The present disclosure relates to electronic device enclosures, and particularly to an electronic device enclosure of a server or a computer.

2. Description of Related Art

Generally, a data storage device, such as a hard disk drive, is secured to a mounting bracket, and then the bracket is secured to an enclosure of a computer or a sever. The mounting bracket includes two sidewalls. One sidewall is secured to a side plate of the enclosure. A first end of the other sidewall is rotatably mounted to a mounting plate in the enclosure. A second end of the other sidewall opposite the first end is hung on the enclosure. When the mounting bracket is vibrated, the other sidewall may be easily deformed and cause the data storage device to disengage from the mounting bracket.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
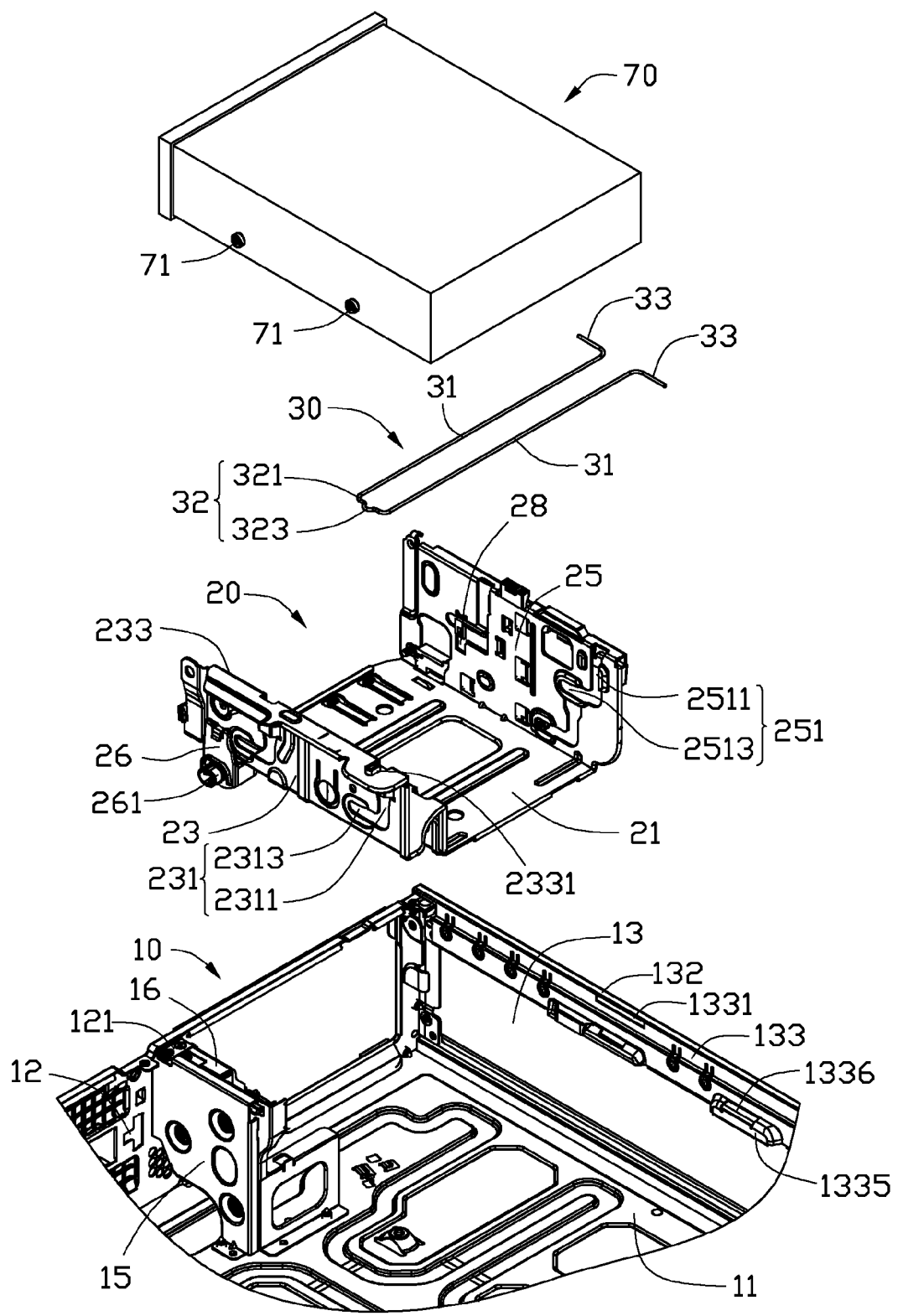
FIG. 1 is an exploded, isometric view of an embodiment of an electronic device enclosure and a data storage device.
Figure 2:
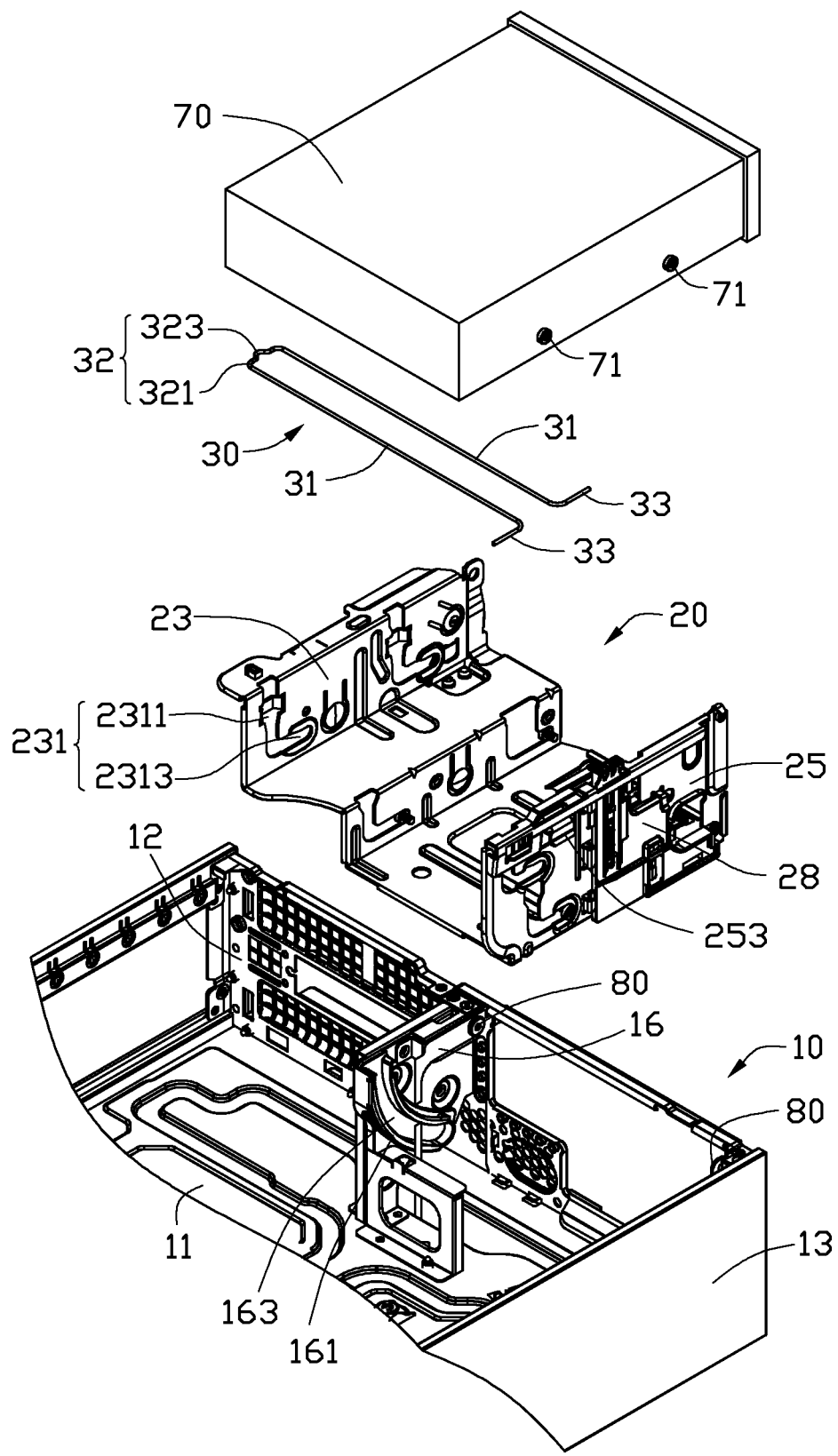
FIG. 2 is similar to FIG. 1, but viewed from a different aspect.

Referring to FIG. 1 and FIG. 2, an electronic device enclosure in accordance with an embodiment includes a frame 10, a mounting bracket 20 and a maintaining member 30.

The frame 10 includes a bottom plate 11, a front plate 12, a side plate 13, and a top plate (not shown). In one embodiment, the bottom plate 11 is substantially parallel to the top plate, and the front plate 12 is substantially perpendicular to the side plate 13. A mounting piece 121 extends from the front plate 12. The mounting piece 121 is substantially parallel to the bottom plate 11. A bracket 15 is secured to the bottom plate 11 and the mounting piece 121. A limiting member 16 is secured to the bracket 15 and the mounting piece 121 and faces the side plate 13. The limiting member 16 includes two limiting pieces 161. A limiting slot 163 is defined between the two limiting pieces 161. In one embodiment, the two limiting pieces 161 are curved, and the limiting slot 163 is curved. A flange 132 extends from a top edge of the side plate 13. A mounting plate 133 extends from the flange 132. In one embodiment, the flange 132 is substantially perpendicular to the side plate 13, and the mounting plate 133 is substantially parallel to the side plate 13. A gap is defined between the mounting plate 133 and the side plate 13. The mounting plate 133 defines an installing opening 1331. The mounting plate 133 includes two mounting portions 1335. Each of the two mounting portions 1335 defines a mounting hole 1336.

The mounting bracket 20 includes a bottom wall 21, a first sidewall 23, and a second sidewall 25 opposite to the first sidewall 23. The first sidewall 23 and the second sidewall 25 are substantially perpendicularly connected to the bottom wall 21. A limiting plate 233 extends from a top edge of the first sidewall 23. The first sidewall 23 defines two first securing slots 231. Each of the two first securing slots 231 includes a first inserting portion 2311 and a first receiving portion 2313. The first inserting portion 2311 is substantially perpendicular to the bottom wall 21. The first receiving portion 2313 is substantially parallel to the bottom wall 21 and communicates with the first inserting portion 2311. A sliding member 26 is secured to a first end of the first sidewall 23 away from the recess portion 2331. A sliding block 261 protrudes from the sliding member 26. A second end of the first sidewall 23 opposite to the first end is hung on the frame 10. A protruding block 2331 protrudes from the limiting plate 233 and is adjacent to the second end of the first sidewall. The protruding block 2331 can be engaged with the maintaining member 30. The second sidewall 25 defines two second securing slots 251. Each second securing slots 251 includes a second inserting portion 2511 and a second receiving portion 2513. The second inserting portion 2511 is substantially perpendicular to the bottom wall 21. The second receiving portion 2513 is substantially parallel to the bottom wall 21 and communicates with the second inserting portion 2511. Two latching pieces 253 extend from the second sidewall 25 and can be secured to each of the two mounting portions 1335. A positioning member 28 is secured to the second sidewall 25.

A maintaining member 30 includes two pressing poles 31, a positioning portion 32, and two latching poles 33. The positioning portion 32 is connected to the two pressing poles 31. Each of the two latching poles 33 extends from each of the two pressing poles 31. The positioning portion 32 and the each of the two latching poles 33 are located on two opposite sides of the each of the two pressing poles 31. The positioning portion 32 includes a connecting pole 321 and a protruding portion 323. The connecting pole 321 is connected to the two pressing poles 31. The protruding portion 323 protrudes from the connecting pole 321 away from two latching poles 33. In one embodiment, the two pressing poles 31 are substantially parallel to each other, and the two latching poles 33 are substantially perpendicular to the two pressing poles 31. The two latching poles 33 can be engaged in the cap between the side plate 13 and the mounting plate 133. A width of the installing opening 1331 is substantially equal to a distance between the two pressing poles 31.

Figure 3:
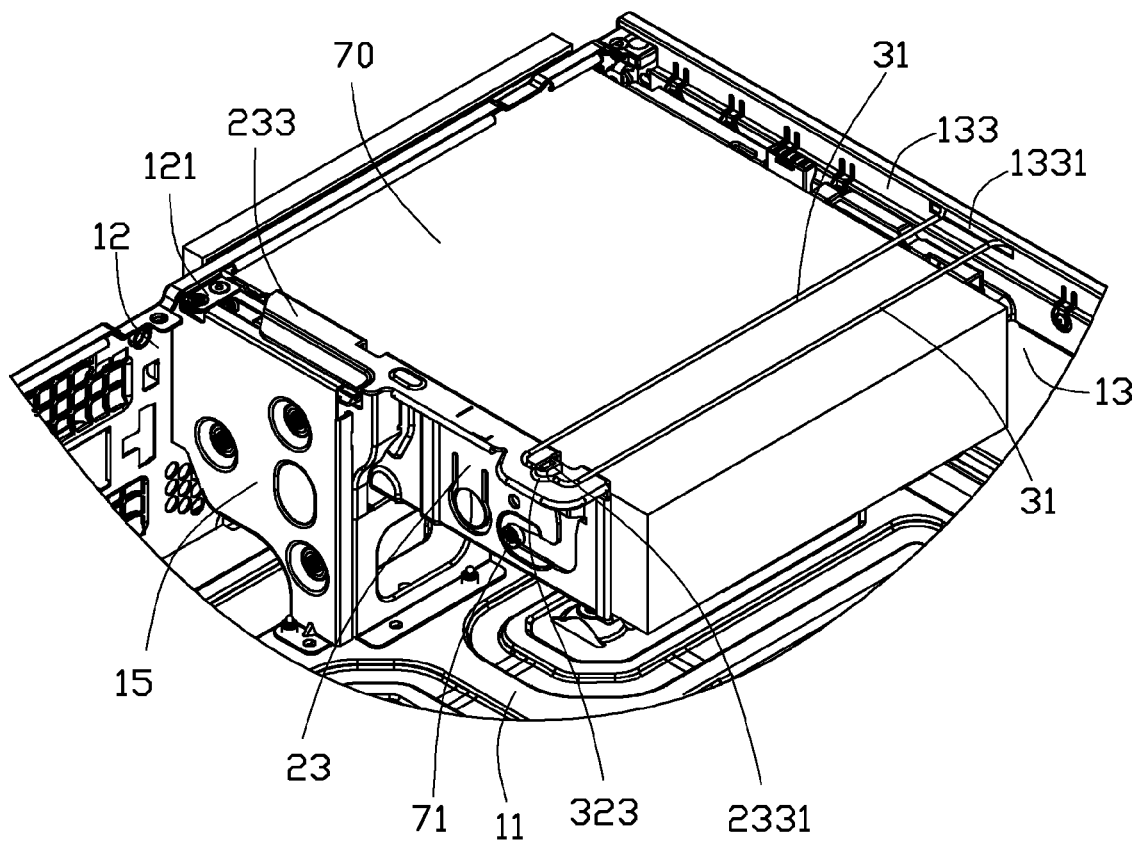
FIG. 3 is an isometric view of the assembled electronic device enclosure and the data storage device of FIG. 1.

Referring to FIG. 3, in assembly, the mounting bracket 20 is moved towards the frame 10, and the second sidewall 25 is adjacent to the side plate 13. The first sidewall 23 and is rotatably mounted to the limiting member 16 by a shaft 80. The first end of the second sidewall 25 is rotatably mounted to the mounting plate 133 by another one of the shaft 80. The sliding block 261 is received in the limiting slot 163. The mounting bracket 20 is rotated towards the bottom plate 11, the sliding block is slid in the limiting slot 163. Until each of the two latching pieces 253 is engaged in the mounting hole 1336, the mounting bracket 20 is secured to the frame 10. The second end of the first sidewall 23 is hung on the frame 10.

The mounting bracket 20 is capable of securing a data storage device 70. Two installing members 71 are located on each of two opposite sides of the data storage device 70. The two installing members 71 are inserted from the first inserting portion 2311 and the second inserting portion 2511, and then received in the first receiving portion 2313 and the second receiving portion 2513. The two installing members 71 are slidable in the first receiving portion 2313 and the second receiving portion 2513. The positioning member 28 blocks one of the two installing members 71, to prevent the data storage device 70 from moving in each of the two first securing slots 231 and each of the two second securing slots 251.

In assembly of the maintaining member 30, the maintaining member 30 is moved towards the mounting bracket 20, and the protruding portion 323 surrounds the protruding block 2331. The two pressing poles 31 are driven to elastically deform towards each other. The two latching poles 33 are moved towards each other. Until the two latching poles 33 are inserted into the mounting hole 1336, the two latching poles 33 rebound to engage in the gap between the mounting plate 133 and the side plate 13. In the same time, the two latching poles 33 rebound to pull the mounting bracket 20 towards the side plate 13 and further fasten the mounting bracket 20.

When the mounting bracket 20 is vibrated along a direction substantially perpendicular to the side plate 13, the maintaining member 30 prevents the first sidewall 23 from deforming away from the side plate 13. Thus, the data storage device 70 is blocked to move away from the side plate 13 to disengage from the second sidewall 25. When the mounting bracket 20 is bumped, a power is generated to the limiting member 16 and the bracket 15. The maintaining member 30 receives a part of the power and transfer the power to the side plate 13. Thus, the power affecting to the limiting member 16 and the bracket 15 is reduced.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device enclosure comprising:
   a frame comprising a mounting plate;
   a limiting member located in the frame;
   a mounting bracket adapted to receive a data storage device and comprising a first sidewall, a second sidewall opposite to the first sidewall, and a bottom wall substantially perpendicularly connected between the first sidewall and the second sidewall, and the bottom wall adapted to support the data storage device; the second sidewall secured to the mounting plate, and a first end of the first sidewall rotatably received in the limiting member and located between the limiting member and the second sidewall; and a second end opposite to the first end of the first sidewall hung on the frame, and a protruding block protruding from the second end; and
   a maintaining member comprising a positioning portion and two latching poles, the two latching poles secured to the mounting plate, and the protruding block engaged with the positioning portion and located between the positioning portion and the mounting plate;
   wherein the maintaining member is substantially parallel to the bottom wall.

2. The electronic device enclosure of claim 1, wherein the frame further comprises a side plate, the mounting plate is secured to the side plate and substantially parallel to the side plate, and the two latching poles are engaged between the mounting plate and the side plate.

3. The electronic device enclosure of claim 2, wherein a gap is defined between the mounting plate and the side plate, the mounting plate defines an installing opening, and the two latching poles are engaged in the gap through the installing opening.

4. The electronic device enclosure of claim 3, wherein the maintaining member further comprises two pressing poles, each of the two pressing poles being connected to each of the two latching poles, and the two pressing poles are elastically deformable towards each other to disengage the two latching poles from the installing opening.

5. The electronic device enclosure of claim 4, wherein each of the two latching poles extends from each of the two pressing poles, and the two latching poles extend along two opposite directions away from each other.

6. The electronic device enclosure of claim 4, wherein the two latching poles are substantially perpendicular to the two pressing poles.

7. The electronic device enclosure of claim 4, wherein the two pressing poles are connected to the positioning portion, and the positioning portion and each of the two latching poles are located on two opposite ends of each of the two pressing poles.

8. The electronic device enclosure of claim 4, wherein the positioning portion comprises a connecting pole and the protruding portion, the connecting pole is connected to the two pressing poles and substantially parallel to the two latching poles, and the protruding portion extends from the connecting pole away from the two latching poles; and the protruding block is engaged with the protruding portion.

9. The electronic device enclosure of claim 3, wherein a width of the installing opening is substantially equal to a distance between the two pressing poles.

10. The electronic device enclosure of claim 2, wherein the frame further comprises a front plate connected to the side plate, the mounting bracket is rotatably mounted to the front plate, and the limiting member defines a curved slot; a sliding member is secured to the first sidewall, a sliding block is located on the sliding member, and the sliding block is slidably received in the curved slot.

11. An electronic device enclosure comprising:
    a frame comprising a side plate and a mounting plate extending from the side plate, a gap defined between the mounting plate and the side plate, and the mounting plate defining an installing opening;
    a limiting member located in the frame;
    a mounting bracket adapted to receive a data storage device and comprising a first sidewall, a second sidewall opposite to the first sidewall, and a bottom wall substantially perpendicularly connected between the first sidewall and the second sidewall, and the bottom wall adapted to support the data storage device; the second sidewall secured to the mounting plate, and a first end of the first sidewall rotatably received in the limiting member and located between the limiting member and the second sidewall; and a second end opposite to the first end of the first sidewall hung on the frame, and a protruding block protruding from the second end; and
    a maintaining member comprising a positioning portion, and two latching poles, the two latching poles received in the gap through the installing opening and engaged with the mounting plate, and the protruding block engaged with the positioning portion and located between the positioning portion and the mounting plate;
    wherein the maintaining member is substantially parallel to the bottom wall.

12. The electronic device enclosure of claim 11, wherein the mounting plate is substantially parallel to the side plate.

13. The electronic device enclosure of claim 11, wherein the maintaining member further comprises two pressing poles connected to the two latching poles, and the two pressing poles are elastically deformable towards each other to disengage the two latching poles from the installing opening.

14. The electronic device enclosure of claim 13, wherein a width of the installing opening is substantially equal to a distance between the two pressing poles.

15. The electronic device enclosure of claim 13, wherein each of the two latching poles extends from each of the two pressing poles, and the two latching poles extend along two opposite directions away from each other.

16. The electronic device enclosure of claim 13, wherein the two latching poles are substantially perpendicular to the two pressing poles.

17. The electronic device enclosure of claim 13, wherein each of the two pressing poles are connected to the positioning portion, and the positioning portion and each of the two latching poles are located on two opposite ends of each of the two pressing poles.

18. The electronic device enclosure of claim 13, wherein the positioning portion comprises a connecting pole and the protruding portion, the connecting pole is connected to the two pressing poles and substantially parallel to the two latching poles, and the protruding portion extends from the connecting pole away from the two latching poles; and the protruding block is engaged with the protruding portion.

19. The electronic device enclosure of claim 11, wherein the frame further comprises a front plate connected to the side plate, the mounting bracket is rotatably mounted to the front plate, and the limiting member defines a curved slot; a sliding member is secured to the first sidewall, a sliding block is located on the sliding member, and the sliding block is slidably received in the curved slot.

\* \* \* \* \*